United States Patent [19]

Boone et al.

[11] Patent Number: 4,936,425

[45] Date of Patent: Jun. 26, 1990

[54] METHOD OF OPERATING A VIBRATION ATTENUATING SYSTEM HAVING SEMIACTIVE DAMPER MEANS

[75] Inventors: Kenneth R. Boone, Raleigh; Lane R. Miller, Fuquay-Varina; Warren R. Schroeder, Cary; Charles M. Nobles, Fuquay-Varina, all of N.C.

[73] Assignee: Lord Corporation, Erie, Pa.

[21] Appl. No.: 310,110

[22] Filed: Feb. 10, 1989

[51] Int. Cl.$^5$ .............................................. B60G 17/08
[52] U.S. Cl. .................................. 188/299; 280/707; 188/280
[58] Field of Search ............... 188/280, 299; 280/707; 364/424, 434

[56] References Cited

U.S. PATENT DOCUMENTS

| | | | |
|---|---|---|---|
| 2,235,488 | 3/1941 | Mercier | 188/88 |
| 3,321,210 | 5/1967 | Delchev | 280/6 |
| 3,420,341 | 1/1969 | Keehn, II. | 188/88 |
| 3,807,678 | 4/1974 | Karnopp et al. | 248/358 R |
| 3,826,343 | 7/1974 | Heymann | 188/282 |
| 3,995,883 | 12/1976 | Glaze | 280/707 |
| 4,034,860 | 7/1977 | Leppich | 188/282 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,530,425 | 7/1985 | Veaux et al. | 188/299 |
| 4,620,619 | 11/1986 | Emura et al. | 188/319 |
| 4,635,765 | 1/1987 | Schmidt | 188/299 |
| 4,660,686 | 4/1987 | Münning et al. | 188/280 |
| 4,696,489 | 9/1987 | Fujishiro et al. | 280/707 |
| 4,714,272 | 12/1987 | Buma et al. | 280/707 |
| 4,742,998 | 5/1988 | Schubert | 267/136 |
| 4,743,300 | 5/1988 | Karnopp | 267/218 |
| 4,756,549 | 7/1988 | Kurosawa et al. | 280/707 |
| 4,770,438 | 9/1988 | Sugasawa et al. | 280/707 |
| 4,786,034 | 11/1988 | Heess et al. | 267/64.15 |
| 4,804,203 | 2/1989 | Glab et al. | 280/707 |
| 4,815,575 | 3/1989 | Murty | 280/707 |

FOREIGN PATENT DOCUMENTS 1336186 7/1963 France.
1188453 4/1970 France.
2164120 3/1986 United Kingdom.

OTHER PUBLICATIONS

Margolis, The Chatter of Semi-Active On-Off Suspension and Its Cure, Vehicle System Dynamics, vol. 13, 1984.
Krasnicki, The Experimental Performance of an "On-OFF" Active Damper, Lord Corporation Technical Article, Circa 1981.
Hrovat et al., An Experimental Comparison Between Semiactive and Passive Suspensions for Air-Cushion Vehicles, Int. J. of Vehicle Design, 1981.
Lord Corporation Semi-Active Suspensions, Lord Corporation Technical Article.
Crosby et al., Vibration Control Using Semi-Active Force Generators, Transaction of the ASME Paper No. 73-DET-122.
Margolis et al., Heave Mode Dynamics of a Tracked Air Cushion Vehicle with Semiactive Airbag Secondary Suspension, Journal of Dynamic Systems Measurement and Control, Dec. 1975, pp. 399-407.
Margolis, Semi-Active Control of Wheel Hop in Ground Vehicles, Vehicle System Dynamics, 1983, pp. 317-330.

Primary Examiner—Andres Kashnikow
Assistant Examiner—Matthew C. Graham
Attorney, Agent, or Firm—Bell, Seltzer, Park & Gibson

[57] ABSTRACT

The system includes at least one semiactive damper whose switching between high damping and low damping states is at times delayed until the relative velocity across the damper is no greater than a preselected low magnitude, or until the energy stored by a resilient deformable system member is no greater than a predetermined magnitude, or until the first to occur of either of the foregoing events.

31 Claims, 3 Drawing Sheets

METHOD OF OPERATING A VIBRATION ATTENUATING SYSTEM HAVING SEMIACTIVE DAMPER MEANS

FIELD OF THE INVENTION

This invention relates to vehicle suspensions and similar mounting systems for attenuating the transmission of vibratory and other similar forces between relatively movable members interconnected by semiactive damper means that is rapidly and repeatedly switched, during operation of the system and pursuant to a preselected control policy, between alternative high damping and low damping states wherein the damping coefficient of the damper means is respectively relatively high and relatively low. The invention more specifically relates to an improved method that reduces undesirable shock forces and/or noise which are at times generated during operation of a system containing semiactive damper means of the foregoing type.

BACKGROUND OF THE INVENTION

Dampers have long been used in mounting systems such as the suspension systems of automobiles and other vehicles. The dampers may and normally do consist of piston and cylinder assemblies whose variable volume chambers are interconnected by an orifice through which hydraulic fluid is displaced and by which it is throttled to an extent that is a function of the size of the orifice. The most commonly used damper assemblies are purely "passive" ones in which the orifice size, and therefore the damping coefficient or function of the damper, are fixed or are subject to only infrequent adjustment. A known deficiency of passive dampers is that the damping forces generated by them will at times amplify, rather than attenuate, the transmission of energy between the members interconnected by the dampers.

"Fully active" dampers or actuator devices, which include high-pressure pumps or other sources of pressurized fluid, are also known. While such devices can achieve excellent attenuation of vibratory and similar forces, their expense, weight and/or bulk make them unsuitable for many applications.

A third type of known damper assembly is the "semiactive" one. A semiactive damper, in keeping with a purely passive damper, has no hydraulic pump, and therefore may be less expensive, heavy and bulky than a fully active damper. However, in contrast to the purely passive dampers, semiactive ones are rapidly switchable between high and low damping states in which the damping coefficient or function thereof is respectively relatively high and relatively low. When switching of a semiactive damper between its states is controlled by and pursuant to a suitable control policy, the force attenuation achieved is much better than that realized by a passive damper and approaches that realized by a fully active damper. Semiactive dampers, and in some instances control policies for them, are disclosed in U.S. Pat. Nos. 3,807,678, 3,995,883, 4,468,050, 4,468,739, 4,491,207, 4,696,489 and 4,742,998; and also in, U.S. Pat. application Ser. Nos. 06/913,067 now U.S. Pat. No. 48L1849, filed 29 Sept. 1986, and 06/945,380 now U.S. Pat. No. 4881A2, filed 22 Dec. 1986, both owned by the assignee of the present application. The disclosures of the aforesaid patents and patent applications are incorporated herein by reference. U.S. Pat. Nos. 3,807,678, 4,491,207 and 4,696,489 each disclose damper control policies based upon the sign (i.e., plus or minus) of the product of the absolute velocity of one of the damper-interconnected members times the relative velocity between such members. U.S. patent application Ser. No. 06/913,067 discloses a semiactive damper control policy based upon the sign of the product of the relative displacement of the interconnected members times the relative velocity between such members. The control procedure disclosed in U.S. patent application Ser. No. 06/945,380 utilizes observers or models to predict the output that would be achieved by a mounting system in each of the different states of its semiactive damper means, and employs a control policy which causes the actual state of the damper means to correspond with the state thereof in the one of the models producing the optimum output estimate.

Although generally producing good results, systems having semiactive damper means controlled in strict accordance with control policies of the foregoing types, or ones similar thereto, may experience shock forces of significant magnitude at some of the times when the damper means is switched from one to the other of its states. The aforesaid shocks may stress system components to such an extent as to shorten their useful life, and/or may cause the generation of objectionable noise. The problem of noise generation appears to be particularly severe in automobile suspensions or other systems containing a resilient deformable member, such as an automobile tire or damper bushing, that is in series with the damper and is capable of storing energy upon deformation and of abruptly releasing the stored energy upon its subsequent return to or toward an undeformed condition.

SUMMARY OF THE INVENTION

With the foregoing in mind, the present invention provides an improved control method which reduces generation of shock forces tending to occur in a vehicle suspension, or other mounting system having at least one semiactive damper, and which therefore reduces system stress and noise.

In one embodiment of the invention, the aforesaid desirable results are achieved by delaying switching of the semiactive damper, from one to the other of its high damping/low damping operating conditions or states, until such time as the relative velocity across the damper is no greater than some preselected relatively low magnitude.

In another embodiment wherein the mounting system is one containing, in series with the damper, a tire or other resilient deformable member that during system operation undergoes periodic deformation and relaxation, with ensuing respective storage and release of energy, switching of the damper from one to the other of its operating conditions or states is delayed until the energy stored by the deformable member is no greater than some preselected low magnitude. Alternatively, switching of the damper means may be delayed until either the stored energy of the deformable member or the relative velocity across the damper becomes no greater than a preselected relatively low magnitude, whichever occurs first.

Delayed switching of the damper means until such time as the relative velocity across the damper means is no greater than a preselected low magnitude may be caused to occur only when the change in the damper state is from low damping to high damping, or from high damping to low damping, or from either of its damping states to the other of its damping states. However, in the above-described situation wherein the system contains a deformable energy storing and releasing member in series with the damper, particularly significant benefits are achieved when there is delay in switching that would result in a change in the damper state from high damping to low damping.

DESCRIPTION OF THE DRAWINGS

Other features of the invention will be apparent from the following description of illustrative embodiments thereof, which should be read in conjunction with the accompanying drawings, in which.

DESCRIPTION OF THE PREFERRED EMBODIMENT

Figure 1:
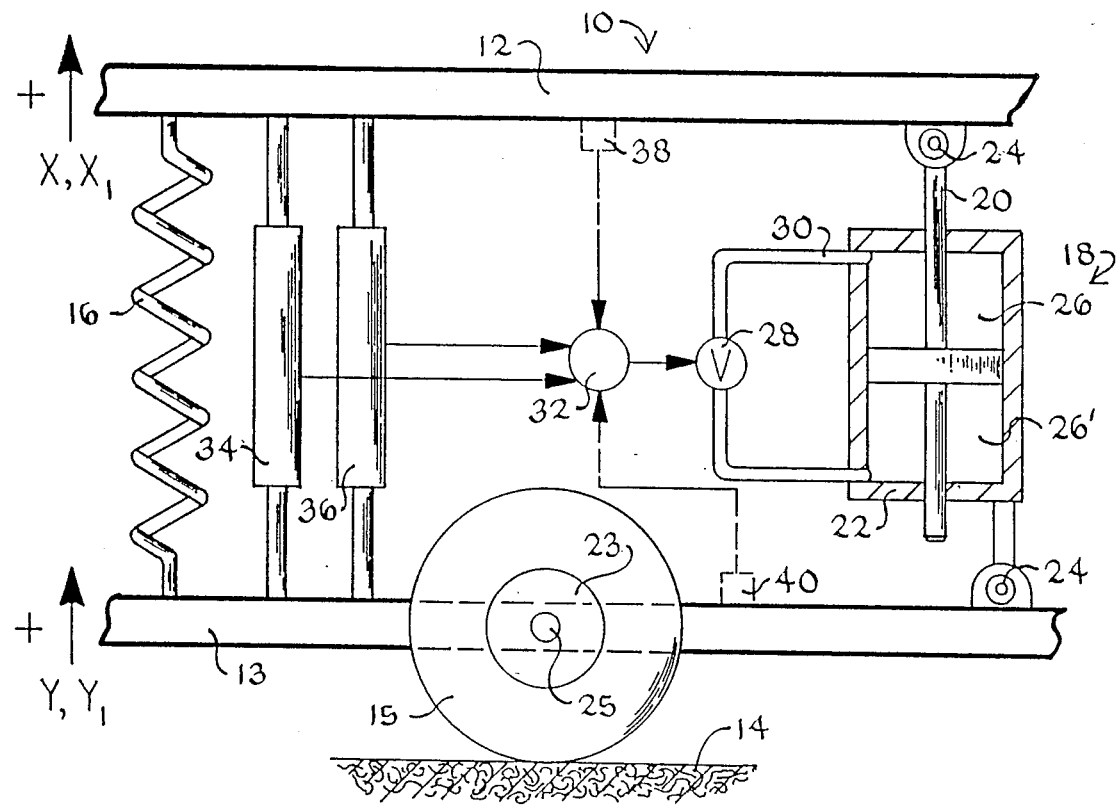
FIG. 1 is a schematic view of a force attenuating suspension or similar mounting system having semiactive damper means controllable in accordance with and suitable for practice of the invention.

The numeral 10 in FIG. 1 designates a two degree of freedom suspension or similar force-attenuating mounting system interconnecting vertically spaced and relatively movable supported and supporting members 12, 13, respectively. By way of example, members 12, 13 may respectively be body and frame components of an automobile or other motor vehicle that is supported upon a road or similar surface 14 by conventional resiliently deformable tire members 15, only one of which is shown. A primary function of a vehicle suspension system such as system 10 might be to isolate supported member 12 insofar as possible from vibratory and/or other forces transmitted to member 13 by such things as road-surface irregularities, engine disturbances, etc. The designations X, $X_1$ respectively designate the absolute vertical displacement and the absolute velocity of supported member 12, it being arbitrarily indicated that these are positive when in an upward direction and thus are negative when in a downward direction. The same sign convention and the letters Y, $Y_1$ similarly designate the absolute vertical displacement and the absolute velocity of supported member 13. When system 10 is at rest, X, $X_1$, Y and $Y_1$ are all zero.

System 10 includes compression spring means 16 and semiactive damper means 18 which extend in substantially parallel relationship to each other between members 12, 13 and are connected to such members. While only a single spring/damper set is shown, more would normally be provided in the typical vehicle suspension system. Damper assembly 18 is illustratively of the hydraulic piston and cylinder type. The rod 20 and cylinder 22 of damper 18 are secured to respective ones of the supported and supporting members 12, 13 by suitable connectors that illustratively include deformable bushing members 24 formed of elastomer or similar resilient compliant material. Relative vertical movement between members 12, 13 displaces hydraulic fluid between variable volume chambers 26, 26' of damper 18 via an electrically or otherwise rapidly adjustable control valve 28 forming part of a hydraulic circuit 30 interconnecting such chambers. Rod 20 of damper 18 illustratively and preferably extends through both of the cylinder chambers 26, 26' such that the amount of fluid displaced between the chambers is the same irrespective of whether the displacement is produced by compression or by extension of the assembly. This eliminates the need for an accumulator or the like (not shown) in association with damper 18. In dampers wherein the rod projects from only one side of the piston, an accumulator may and normally would be provided.

Control valve 28 is rapidly switchable between at least two different operating positions or conditions. In one of these operating conditions valve 28 significantly throttles or restricts the flow of hydraulic fluid through fluid circuit 30. This causes damper 18 to then occupy or be in a high damping state wherein its damping coefficient is relatively large. In the other one of its operating positions or conditions, valve 28 permits relatively free flow of hydraulic fluid through conduit 30 and thus between cylinder chambers 26, 26'. This results in damper 18 then being in a low damping state wherein its damping coefficient is of a preselected relatively small magnitude, which may be approximately zero.

Switching of valve 28 between its aforesaid operating conditions, and therefore switching of damper 18 between high and low damping states, is produced by suitable electronic control means 32 operable pursuant to a preprogrammed control policy and to input data received from preselected ones of a plurality of motion sensors 34, 36, 38 and 40 associated with members 12, 14. Sensors 34, 36 directly detect relative displacements and relative velocities of supported and supporting members 12, 14. Sensors 38, 40 respectively detect accelerations of supported member 12 and supporting member 14, which accelerations can be utilized by such sensors and/or by control means 32 to derive displacement, absolute velocity and/or relative velocity data. Since the data produced by sensors 34, 36 can also be derived from the data produced by acceleration sensors 38, 40, it will be appreciated that not all of the illustrated sensors need be employed or provided in association with system 10.

Controller 32 is preprogrammed so as to operate in accordance with a modified version of any preselected one of a plurality of semiactive damper control policies, such as those hereinbefore described. One such "standard" control policy, which is disclosed in U.S. Pat. Nos. 3,807,678, 3,491,207 and 4,696,409, is based upon the sign of the product of the relative velocity $(X_1-Y_1)$ between the supported and supporting members times the absolute velocity $(X_1)$ of the supported member. More specifically, the aforesaid control policy dictates that the state of the semiactive damper be high when $X_1(X_1-Y_1) > 0$, i.e., when the sign of the aforesaid product is positive or plus; and that the damper's damping state be low when $X_1(X_1-Y_1)$ is $<0$, i.e., when the product sign is negative or minus. In its implementation of this control policy, controller 32 may obtain the necessary data with respect to relative velocity from sensor 36 or may derive all of the necessary data from that supplied by accelerometers 38, 40. A second previously devised control policy which may be utilized, in modified form, by controller 32 is that disclosed in U.S. Application Serial No. 09/913,067 now U.S. Pat. No.

482,849. This control policy is based upon the sign of the product of the relative velocity $(X_1-Y_1)$ of the supported and supporting members times the relative displacement $(X-Y)$ of such members. Pursuant to the standard version of this policy the damper is caused to be in its high damping state when $(X-Y)(X_1-Y_1)$ is $<$ 0, i.e., when the sign of the aforesaid product is minus or negative; and is caused to be in its low damping state when $(X-Y)(X_1-Y_1) > 0$, i.e., when the sign of the product is plus or positive. The relative displacement and relative velocity data needed for implementation of the policy may be obtained directly from sensors 34, 36 or, alternatively, may be derived from the data produced by acceleration sensors 38, 40. Another previously devised control policy which might be used in modified form by controller 32, and which is disclosed in U.S. application Ser. No. 06/945,380, filed 22 Dec. 1986 now U.S. Pat. No. 4881172, utilizes "observer" models to produce estimates of the different system output or performance that would ensue when the semiactive damper means occupies different ones of its possible operating conditions or states. The damper means in the real system is then caused to assume whichever of its damping states is occupied by the damper means in the model producing the optimum system performance estimate.

Figure 2:
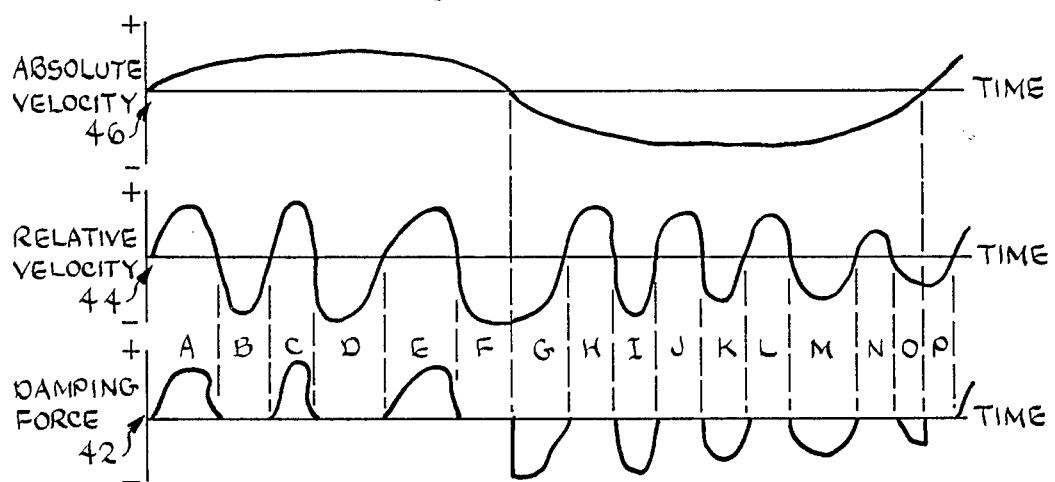
FIG. 2 is a simplified graphic illustration of the relationship between velocities and damper forces of semiactive damper means controlled in a conventional fashion in accordance with a known control policy.

In the "standard" forms of the foregoing control policies, switching of the damper assembly from one to the other of its damping states is effected substantially immediately, i.e., without any intentional delay, whenever the control policy dictates that a change in the damping state of the damper means should be made. This at times results in the generation of shock forces that may, in certain utilizations of the semiactive damper means, create stresses and/or noise of objectional magnitudes. One reason for this is apparent from the FIG. 2 simplified representation of damping forces 42 such as might typically be produced by the damping means 18 of FIG. 1, under differing conditions of the relative velocity $(X_1-Y_1)$ 44 of members 12, 13 and the absolute velocity $(X_1)$ 46 of member 12, when the damper means is controlled in accordance with the standard control policy based upon the sign of the product of the aforesaid velocities. As is indicated in FIG. 2 and as is normally the case, the sign of the relative velocity 44 of members 12, 13 changes much more frequently than the sign of the absolute velocity 46 of member 12. The magnitude of damping force 42 at any given time is a function of the then existing relative velocity 44, the then existing damping state of damper 42, and the preselected damping coefficient possessed by the damper when in such state. In accordance with the dictates of the standard control policy in question, and as is indicated by the lowermost plot of FIG. 2, during those time intervals B, D, F, H, J, L, N and P when the product of the relative velocity 44 and absolute velocity 46 is less than zero, i.e., negative or minus, damper 18 is caused to be in its low damping state and the damping forces 42 are therefore of preselected relatively low magnitude. While such preselected relatively low magnitude may be and illustratively is approximately zero, it may be greater, and should be in certain systems such as vehicle suspensions where "wheel hop" may be a problem. During those other time intervals A, C, E, G, I, K, M and O when the product of the absolute and relative velocities 46, 44 is greater than zero, i.e., positive or plus, damper 18 is caused to occupy its high damping state wherein it produces significant damping forces 42 that are proportional to or some other function of the relative velocity 44. Except for G and O, all of the latter time intervals begin and end when the relative velocity 44 is zero, as a consequence of which the damping forces 42 generated within such intervals have few if any discontinuities or abrupt variations. However, in the two time intervals G and O wherein changes in the damping state of damper 18 result from changes in the sign of the absolute velocity 46 rather than from sign changes of the relative velocity 44, abrupt changes in the damping force may and illustratively do occur. In the case of the damping force 42 generated at the outset of time interval G, when the control policy dictates the damper state be switched from low to high due to the change in the sign of the absolute velocity 46 from positive to negative, the relative velocity 44 may then be and illustratively is quite large. Since the magnitude of the damping force 42 is a function of the relative velocity 44, an abrupt and large increase in the damping force 42 occurs at the outset of time interval G. Similarly, at the end of time interval O, when the standard control policy dictates a change in the damping state from high to low due to another change in sign of the absolute velocity 46, damping force 42 undergoes another abrupt change, which illustratively is a decrease. Either or both of the aforesaid abrupt changes or discontinuities of the damping force 42 may produce shocks and/or noise of undesirable magnitude in the system 10 with which damper 18 is associated.

Figure 3:
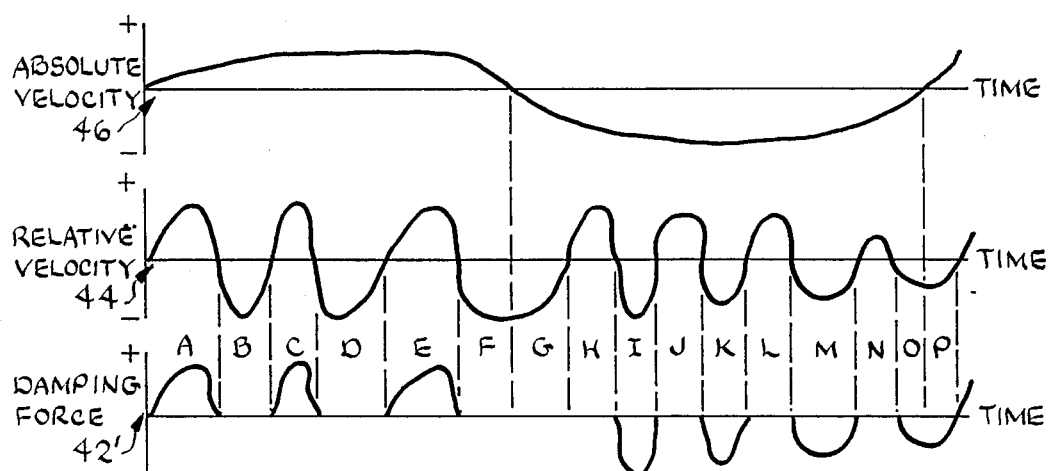
FIG. 3 is a graphic illustration similar to FIG. 2 showing the changed damper forces that ensue when switching of the damper means between its high and low damping states is delayed in accordance with the present invention.

FIG. 3 indicates the changes that ensue in the damping force 42, under the same velocity conditions as are illustrated in FIG. 2, when the aforesaid standard control policy is modified so as to delay state changes of damper 18 until the relative velocity 44 is equal to or less than a preselected low magnitude. In the illustration of FIG. 3, the preselected low magnitude of the relative velocity is approximately zero, which is the lowest possible since the positive or negative sign of the relative velocity 44 is not considered in determining its preselected magnitude. The aforesaid modification of the control policy eliminates the abrupt damper force increase and decrease respectively shown in FIG. 2 in the respective time intervals G and 0. More specifically, the modified control policy eliminates substantially all damping force in time interval G, and causes that commencing at the outset of interval O to continue, rather than abruptly terminating, into and through interval P. Although not shown in FIG. 3 or in the similar graphic illustration of FIG. 5, the damping force changes from low to high as the relative velocity reaches a preselected low magnitude immediately preceding the point G/H, and then changes back again to low as the relative velocity passes through and beyond point G/H. Since the aforesaid change in the damper force from low to high is normally of insignificant duration, it is not shown in the drawings.

While the changes in damping force 42 realized by utilization of the aforesaid modified control policy will to some extent degrade the performance of damper 18, there are factors that lessen such effect. Firstly, modification of the control policy does not change the performance of damper 18 at those times when policy-dictated change in damper state is predicated upon change in sign of the relative velocity 44, rather than a change in sign of the absolute velocity 46. As indicated in FIGS. 2 and 3 and as has been previously noted, the relative velocity sign changes are customarily much more frequent than the absolute velocity sign changes. Additionally, the time period during which a damper state change is delayed under the modified version of the control policy is normally relatively brief. For example, in a damper used in the suspension of an automobile operating under normal conditions, the delay normally would be only some 25-50 milliseconds.

In some instances adequate shock and/or noise reduction may be achieved by delaying only some, rather than all, state changes of damper 18 until the relative velocity is no greater than the preselected low magnitude. For instance, it may suffice for damper state changes to be delayed only when the change is from the high damping state to the low damping state, or from the low damping state to the high damping state. Thus, applicants have ascertained that objectionable "thumping" noise generated in certain automobile suspension systems employing semiactive damper means operated in accordance with the unmodified FIG. 2 control policy was greatly reduced by delaying, until the relative velocity across the damper was of a preselected low magnitude, only those damper state changes from high damping to low damping. Delaying of the damper state changes from low damping to high damping had much less apparent effect upon noise generation.

Further investigation of the problem of noise generation in a conventional vehicle suspension system, such as that which is schematically shown in FIG. 1 and which includes a resilient deformable tire member 15 in series with the illustrated damper 18, revealed that the problem is also affected by the condition of the tire. Objectionable noise is particularly likely to ensue when a change in the state of the damper from high to low occurs at a time when the magnitude of the tire's compressive deformation, and thus its stored energy, is of substantial magnitude. When in its high damping state, damper 18 transmits much of the load force of supported suspension member 12 to supporting member 13. This load force, as well as that of member 13, is transmitted via wheel 23 and axle 25 to tire 15, as a result of which the tire compressively deforms and stores energy. Change in its damping state from high to low substantially decouples damper 18, and thus supported suspension member 12, from member 13. In the typical automobile suspension system, the weight of member 12 is customarily many times greater than that of member 13. The change in the state of damper 18 to low therefore greatly reduces the forces tending to maintain tire 15 in a compressively deformed, energy-storing condition. Consequently, the tire undergoes rapid return movement toward an undeformed condition and abruptly transmits a substantial portion of its stored energy, via wheel 23 and axle 25, to member 13. This causes "bouncing" of the aforesaid components and accompanying generation of the objectionable thumping noise. If the particular system contains other resiliently deformable members that are in series with the damper, such as the compliant rubber bushings 24 shown in the system 10 of FIG. 1, these may also occasion the production of objectionable shock forces and/or noise if the damper state is changed from high to low while such members are in a deformed energy-storing condition.

As previously noted, one approach to the aforesaid problem is to delay switching damper 18 from one to the other of its damping states, or at least from its high damping state to its low damping state, until the relative velocity across the damper is no greater than approximately zero or some other preselected low magnitude. Another approach is to delay switching of damper 18 until the magnitude of the deformation and thus the stored energy of tire 15, and/or of some comparable deformable energy-storing member within the system, is no greater than some preselected low magnitude. In the case of tire 15, this can be determined by monitoring the vertical displacement of member 13, either by use of data derived from that produced by acceleration sensor 40, or by use of some other type of sensor (not shown) capable of more directly ascertaining the magnitude of the deformation and/or the stored energy of tire 15.

Still another alternative is to delay change in state of the damper until the relative velocity across it is no greater than the preselected low magnitude or until the magnitude of the stored energy of the tire, or comparable deformable system member, is no greater than a preselected low magnitude, whichever occurs first.

Figure 4:
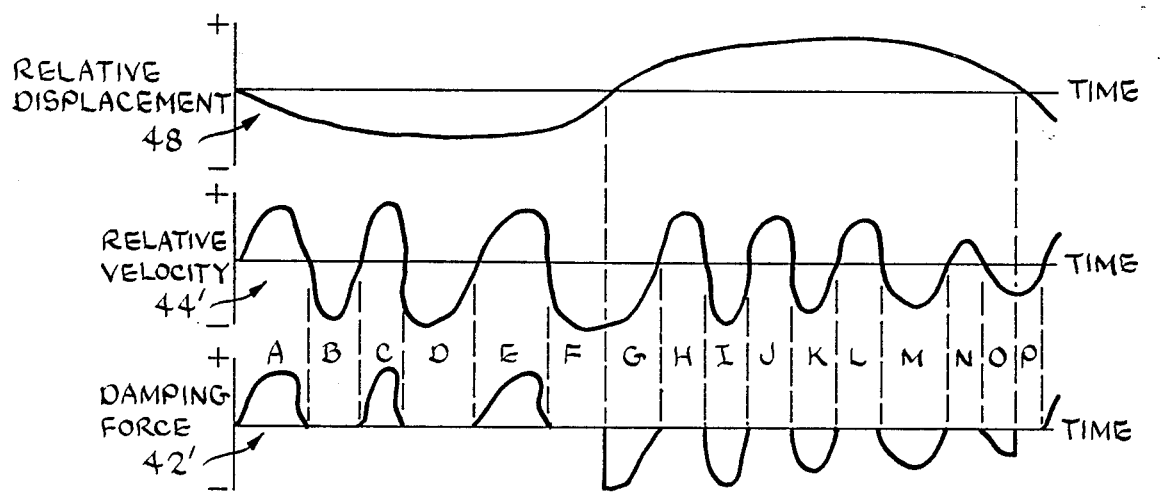
FIGS. 4 and 5 are graphic illustrations similar to FIGS. 2 and 3 but relating to another control policy.
Figure 5:
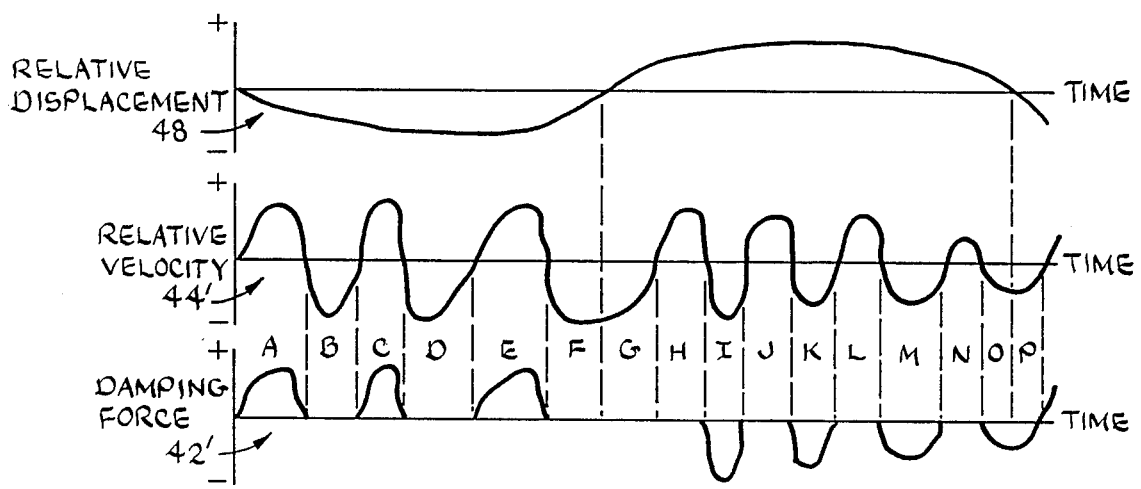

FIGS. 4 and 5 of the drawing are simplified graphic representations, similar to FIGS. 2 and 3, of the damping forces realized in a system, such as system 10 of FIG. 1, wherein the damper 18 is controlled in accordance with the standard version (FIG. 4) and a modified version (FIG. 5) of the damper control policy predicated upon the sign (plus or minus) of the product of the relative velocity of members 12, 13 times their relative displacement. For purposes of simplification of illustration, the relative velocity curve 44' in FIGS. 4 and 5 is the same as the curve 44 in FIGS. 2 and 3; and the relative displacement curve 48 shown in FIGS. 4 and 5 differs from absolute velocity curve 46 of FIGS. 2 and 3 only by being 180 degrees out of phase therewith. Since the control policy based upon the product of relative displacement times relative velocity dictates that damper forces of substantial magnitude be generated when the aforesaid product is less than (versus greater than) zero, this results in the damper forces 42' illustrated in FIGS. 4 and 5 being the same as those illustrated in FIGS. 2 and 3, respectively. While the modified control policy illustrated in FIG. 5 delays change of the state of the damper means until the relative velocity 44' is no greater than approximately zero or some other preselected low magnitude, the delay could apply only to state changes from high damping to low damping, or vice versa, as in the case of the control policy illustrated in FIG. 3. Similarly, in a mounting system having a resilient deformable member such as tire 15 (FIG. 1) that is capable of storing and subsequently releasing energy and is in series with the damper, the modified control policy could delay change of the state of the damper until the magnitude of the deformation and/or stored energy of the deformable member is no greater than some preselected low magnitude, or until the relative velocity 44' is no greater than some preselected low magnitude, or until the first to occur of either of the foregoing events.

Each of the foregoing delay modifications of a control policy are also possible when the damper means is controlled in accordance with the predicted output or performance of observer models of the system, as disclosed in U.S. patent application Ser. No. 06/945,380 now U.S. Pat. No. 4881172. More specifically, if the observer model producing an optimum system output dictates that a semiactive damper should undergo a state change, such change may be delayed until the relative velocity across the damper is no greater than a preselected low magnitude, or until the stored energy within a deformable energy-storing member of the system is no greater than a preselected low magnitude, or until the first to occur of either of the foregoing events. Also in keeping with the previously-discussed control policies, the change of state delay may be made applicable only to changes of the damper state from high to low, or from low to high, or from either of the states to the other of them.

While specific embodiments of the invention have been disclosed and described, this was for purposes of illustration only, and not for purposes of limitation, the scope of the invention being in accordance with the following claims.

We claim:

1. In a method of operating a mounting system including first and second relatively movable members interconnected by a semiactive damper switchable between high damping and low damping states, and a third member in series with the damper and capable of storing energy and of abruptly releasing its stored energy upon switching of damping states of the damper, the improvement comprising:
   delaying switching of the damper from one to the other of its damping states until the relative velocity between the first and second members is no greater than a preselected magnitude or until the energy stored by the third member is no greater than a preselected magnitude, whichever occurs first.

2. A method as in claim 1, wherein the third member is formed at least in part of resilient compressible material.

3. A method as in claim 1, wherein the system is a vehicle suspension system, the first and second members are respectively vehicle body and frame members, and the third member is a tire supporting the frame member.

4. A method as in claim 1, wherein the one of the states is the high damping state of the damper, and the third member is resiliently compressible.

5. A method as in claim 1, wherein the one of the states is the low damping state of the damper.

6. A method as in claim 1, wherein the delaying of the switching of the damper is from either of its states to the other of its states.

7. A method as in any of the preceding claims, wherein the preselected magnitude of the relative velocity is approximately zero.

8. A method as in any of claims 1, 2, 3, 4, 5 or 6, wherein the preselected magnitude of the energy stored by the third member is approximately zero.

9. In the method of controlling operation of a vehicle suspension system including first and second relatively movable members interconnected by a semiactive damper in series with a third member that stores and releases energy and that generates noise upon abrupt release of its stored energy, the damper being switchable between high damping and low damping states pursuant to a control policy calling for switching of the damper to its high damping state when the product of $X_1$ and the sum of $X_1 - Y_1$ is greater than zero and switching of the damper to its low damping state when the product of $X_1$ and the sum of $X_1 - Y_1$ is less than zero, wherein $X_1$ and $Y_1$ are absolute velocities of respective ones of the first and second members and $X_1 - Y_1$ is the relative velocity between the members, the improvement comprising:
   reducing the noise generated, upon release of energy stored by the third member, by delaying switching of the damper from one of its states to the other of its states until $X_1 - Y_1$ is no greater than a preselected magnitude.

10. A method as in claim 9, wherein the one of said states is the high damping state of the damper.

11. A method as in claim 9, wherein the one of the states is the low damping state of the damper.

12. A method as in claim 9, wherein the delaying of the switching of the damper is from either of its states to the other of its states.

13. A method as in any of claims 10, 11 or 12, wherein the preselected magnitude is approximately zero.

14. A method of operating a mounting system including first and second relatively movable members interconnected by a semiactive damper switchable between high damping and low damping states, and a third member in series with the damper and capable of storing energy and of abruptly releasing its stored energy upon switching of the damper from one to the other of its damping states, comprising:
   obtaining data indicative of the magnitude of the energy stored by the third member;
   delaying switching of the damper from one to the other of its damping states until the data indicates the energy stored by the third member is no greater than a preselected magnitude.

15. A method as in claim 14, wherein the third member is resiliently compressible and the obtaining of data indicative of the magnitude of the energy stored by the third member includes obtaining data indicative of the compression of the third member.

16. A method as in claim 14, wherein the system is a vehicle suspension system, the first and second members are respectively vehicle body and frame members, the third member is a tire supporting the frame member, and the one of the damping states is the high damping state.

17. A method as in claim 14, wherein the one of the states is the low damping state of the damper, and the other of the states is the high damping state.

18. A method as in claim 14, wherein the delaying switching of the damper is from either of its states to the other of its states.

19. In the method of attenuating transmission of forces between first and second relatively movable members interconnected by a semiactive damper that generates damper forces in response to relative movement between the members and is switchable between high damping and low damping states in accordance with the dictates of a control policy calling for switching the damper to a high damping state when the product of $X - Y$ and the sum of $X_1 - Y_1$ is less than zero and to a low damping state when the product of $X - Y$ and the sum of $X_1 - Y_1$ is greater than zero, wherein $X - Y$ is the relative displacement between the first and second members, and $X_1 - Y_1$ is the relative velocity between the members, the improvement comprising:
   delaying switching of the semiactive damper from one of its states to the other of its states until $X_1 - Y_1$ is no greater than a preselected magnitude.

20. A method as in claim 19, wherein the one of the states is the high damping state of the semiactive damper.

21. A method as in claim 19, wherein the one of the states is the low damping state of the damper.

22. A method as in claim 19, wherein the delaying of the switching of said damper is from either of its states to the other of its states.

23. A method as in claim 19, wherein the preselected magnitude is approximately zero.

24. In the method of attenuating the transmission of forces in a system having first and second relatively movable members interconnected by a semiactive damper switchable between high damping and low damping states in which the damping function thereof is respectively relatively high and relatively low, the method including obtaining an estimate of the system performance that would ensue if the damper were in its high damping state and obtaining an estimate of the system performance that would ensue if the damper were in its low damping state, and utilizing the estimates of system performance to determine when switching of the states of the damper should occur, the improvement comprising:

delaying switching of the damper from one of its states to the other of its states until the relative velocity between the relatively movable members is equal to or less than a preselected magnitude.

25. A method as in claim 24, wherein the one of the states is the high damping state of the damper.

26. A method as in claim 24, wherein the one of the states is the low damping state of the damper.

27. A method as in claim 24, wherein the delaying of the switching of the damper is from either of its states to the other of its states.

28. A method as in claim 24, wherein the preselected magnitude is approximately zero.

29. In the method of operating a force attenuating mounting system having a semiactive damper switchable between high and low damping states, and a member in series with the damper that stores energy that generates noise upon abrupt release, the improvement comprising reducing the noise generated upon release of energy stored by the third member, by delaying switching of the damper from one to the other of its states until the relative velocity across the damper is no greater than a preselected low magnitude.

30. The method of claim 29, wherein the one of the damper states is the high damping state and the other of the states is the low damping state of the damper.

31. The method of claim 29, wherein the preselected low magnitude is approximately zero.

* * * * *